(12) United States Patent
Hatakeda et al.

(10) Patent No.: US 9,204,126 B2
(45) Date of Patent: Dec. 1, 2015

(54) THREE-DIMENSIONAL IMAGE DISPLAY DEVICE AND THREE-DIMENSIONAL IMAGE DISPLAY METHOD FOR DISPLAYING CONTROL MENU IN THREE-DIMENSIONAL IMAGE

(75) Inventors: Takashi Hatakeda, Tokyo (JP); Shinji Daigo, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 234 days.

(21) Appl. No.: 13/013,118

(22) Filed: Jan. 25, 2011

(65) Prior Publication Data
US 2011/0254844 A1 Oct. 20, 2011

(30) Foreign Application Priority Data

Apr. 16, 2010 (JP) .................................. 2010-095336

(51) Int. Cl.
*H04N 13/00* (2006.01)

(52) U.S. Cl.
CPC ........... *H04N 13/007* (2013.01); *H04N 13/004* (2013.01); *H04N 13/0022* (2013.01)

(58) Field of Classification Search
CPC ............ H04N 13/007; H04N 13/0051; H04N 13/0055; H04N 13/0058; H04N 13/0062; H04N 13/0066; H04N 5/445; H04N 5/44543; H04N 5/44852; H04N 13/004; H04N 13/0022; H04N 13/055; G06F 3/0481; G06F 3/04812; G06F 3/04815; G06F 3/04817; G06F 3/0482; G06F 3/0484; G06F 3/04842; G06F 3/04847
USPC .................. 345/419–427; 715/757, 810–845; 348/42–60
See application file for complete search history.

(56) References Cited

U.S. PATENT DOCUMENTS 5,724,492 A * 3/1998 Matthews et al. ............. 345/419
6,023,277 A * 2/2000 Osaka et al. .................. 345/419

(Continued)

FOREIGN PATENT DOCUMENTS

CN 101523924 9/2009
CN 101682793 3/2010

(Continued)

OTHER PUBLICATIONS

Machine translation of European Patent Publication EP1276073A2.*

(Continued)

*Primary Examiner* — Xiao Wu
*Assistant Examiner* — Michael J Cobb
(74) *Attorney, Agent, or Firm* — Katten Muchin Rosenman LLP

(57) ABSTRACT

A three-dimensional content playback unit outputs to two or more image buffers a plurality of stereoscopic images of three-dimensional content, including a first parallax image and a second parallax image, resulting from viewing an object in a virtual three-dimensional space from different viewpoints. An interrupt request receiving unit receives an interrupt request requesting that a control menu be displayed. A control menu output unit overwrites, responsive to the acquisition of an interrupt request by the interrupt request receiving unit, a drawn image of an object in a three-dimensional space with an image of an object of the control menu drawn with parallax while moving the object of the control menu in the depth direction of the virtual three-dimensional space away from the viewpoint, regardless of the relative positions of the object of the control menu and the object in the three-dimensional space.

4 Claims, 14 Drawing Sheets

(56) References Cited

U.S. PATENT DOCUMENTS

| | | | | |
|---|---|---|---|---|
| 6,313,866 | B1* | 11/2001 | Akamatsu et al. | 348/51 |
| 6,344,860 | B1 | 2/2002 | Watts | |
| 6,411,337 | B2* | 6/2002 | Cove et al. | 348/563 |
| 6,476,807 | B1* | 11/2002 | Duluk et al. | 345/506 |
| 7,178,111 | B2* | 2/2007 | Glein et al. | 715/848 |
| 7,685,619 | B1* | 3/2010 | Herz | 715/848 |
| 8,250,494 | B2* | 8/2012 | Butcher et al. | 715/863 |
| 2002/0118275 | A1* | 8/2002 | Harman | 348/51 |
| 2003/0016225 | A1* | 1/2003 | Ramsay et al. | 345/543 |
| 2004/0100479 | A1* | 5/2004 | Nakano et al. | 345/700 |
| 2006/0031776 | A1* | 2/2006 | Glein et al. | 715/779 |
| 2006/0109283 | A1* | 5/2006 | Shipman et al. | 345/629 |
| 2006/0170644 | A1* | 8/2006 | Ioki et al. | 345/102 |
| 2007/0052725 | A1* | 3/2007 | Ostojic et al. | 345/625 |
| 2007/0136681 | A1* | 6/2007 | Miller | 715/782 |
| 2007/0277112 | A1* | 11/2007 | Rossler et al. | 715/764 |
| 2007/0281022 | A1* | 12/2007 | Bunick et al. | 424/472 |
| 2007/0291030 | A1* | 12/2007 | Fowler et al. | 345/422 |
| 2007/0300184 | A1* | 12/2007 | Song | 715/810 |
| 2008/0055305 | A1* | 3/2008 | Blank et al. | 345/419 |
| 2008/0066010 | A1* | 3/2008 | Brodersen et al. | 715/810 |
| 2008/0238916 | A1* | 10/2008 | Ghosh et al. | 345/419 |
| 2009/0195641 | A1* | 8/2009 | Neuman | 348/47 |
| 2009/0201420 | A1* | 8/2009 | Brown et al. | 348/552 |
| 2009/0237494 | A1* | 9/2009 | Oota et al. | 348/51 |
| 2010/0021145 | A1* | 1/2010 | Oashi et al. | 386/126 |
| 2010/0045780 | A1 | 2/2010 | Kwon et al. | |
| 2010/0074594 | A1* | 3/2010 | Nakamura et al. | 386/92 |
| 2010/0091012 | A1 | 4/2010 | Newton et al. | |
| 2010/0092148 | A1* | 4/2010 | Ogawa et al. | 386/44 |
| 2010/0118119 | A1 | 5/2010 | Newton et al. | |
| 2010/0188572 | A1* | 7/2010 | Card, II | 348/468 |
| 2010/0220175 | A1* | 9/2010 | Claydon et al. | 348/43 |
| 2010/0251170 | A1* | 9/2010 | Louch et al. | 715/810 |
| 2010/0269065 | A1* | 10/2010 | Uchimura | 715/810 |
| 2011/0010666 | A1* | 1/2011 | Choi | 715/810 |
| 2011/0157303 | A1* | 6/2011 | Broberg | 348/43 |
| 2011/0158504 | A1* | 6/2011 | Turner et al. | 382/154 |
| 2011/0187708 | A1* | 8/2011 | Suzuki et al. | 345/419 |
| 2011/0225523 | A1* | 9/2011 | Newton et al. | 715/762 |
| 2011/0242104 | A1* | 10/2011 | Zhang et al. | 345/419 |
| 2012/0102435 | A1* | 4/2012 | Han et al. | 715/848 |
| 2013/0229414 | A1* | 9/2013 | Gruber | 345/426 |

FOREIGN PATENT DOCUMENTS

| | | |
|---|---|---|
| EP | 1276073 A2 * | 1/2003 |
| EP | 1306648 A2 * | 5/2003 |
| JP | 2010-86228 | 4/2010 |
| KR | 20070079826 | 8/2007 |
| KR | 10-2010-0022911 | 3/2010 |
| WO | 2006/111893 | 10/2006 |
| WO | WO 2006132522 A1 * | 12/2006 |
| WO | 2008/038205 | 4/2008 |
| WO | 2008/115222 | 9/2008 |
| WO | 2010/010499 | 1/2010 |

OTHER PUBLICATIONS

OpenGL, HUD Always draw on top?, 2006, <<https://www.opengl.org/discussion_boards/showthread.php/131042-HUD-Always-draw-on-top>>, accessed on May 16, 2015.*
European Search Report dated Jan. 27, 2012, from corresponding European Application No. 11 15 3223.
Korean Notice of Preliminary Rejection dated Jun. 15, 2012, from corresponding Korean Application No. 10-2011-0033113.
Notification of Reason(s) for Refusal dated Apr. 17, 2012, from corresponding Japanese Application No. 2010-095336.
Korean Decision to Refuse a Patent dated Dec. 21, 2012, from corresponding Korean Application No. 10-2011-0033113.
Chinese First Office Action dated Apr. 27, 2013, from corresponding Chinese Application No. 201110042304.0.
Chinese Rejection Decision dated Nov. 8, 2013, from corresponding Chinese Application No. 201110042304.0.

* cited by examiner

FIG.2
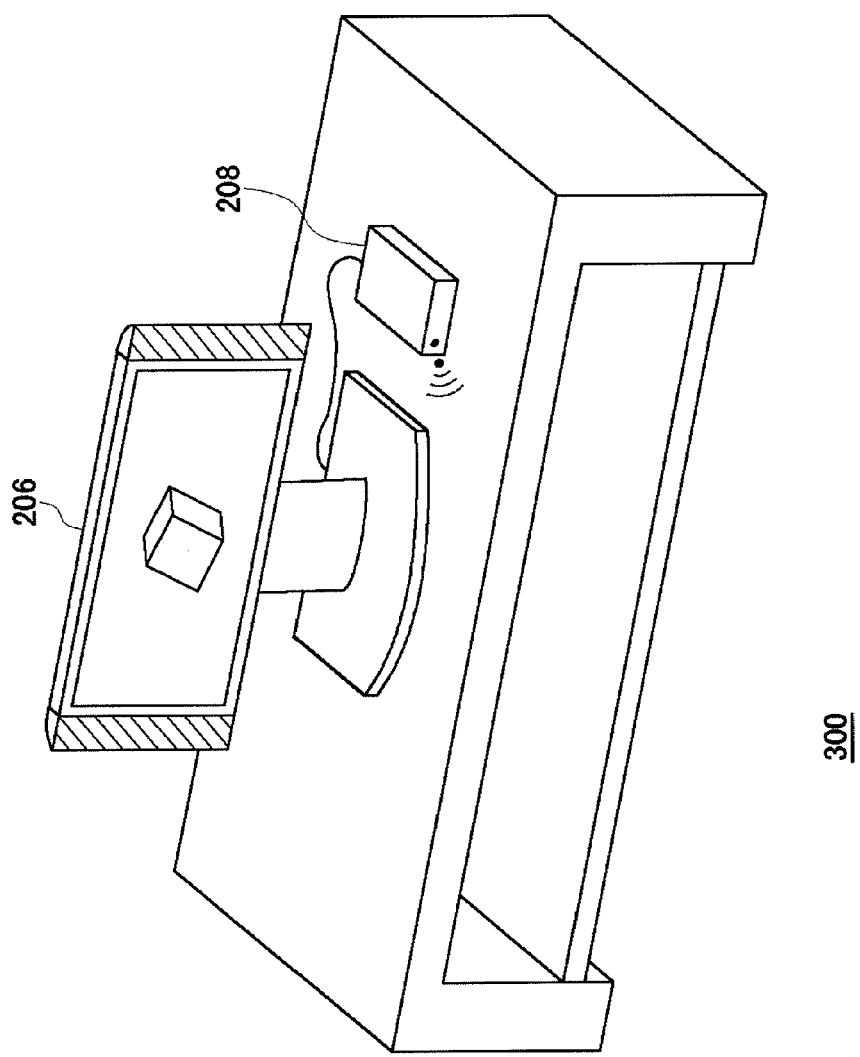
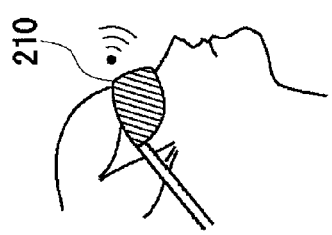

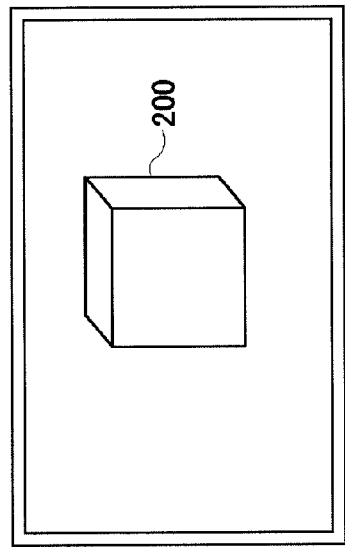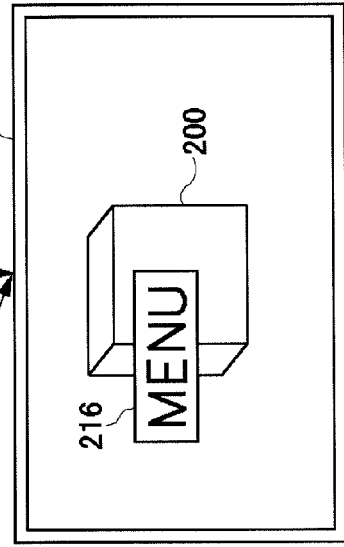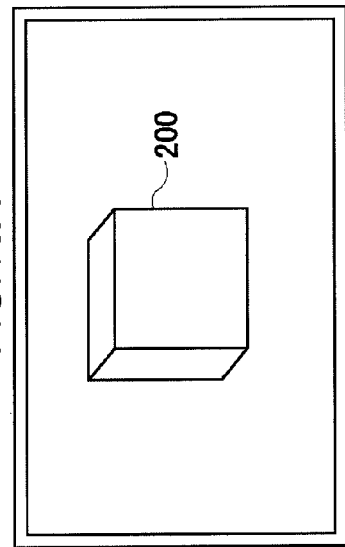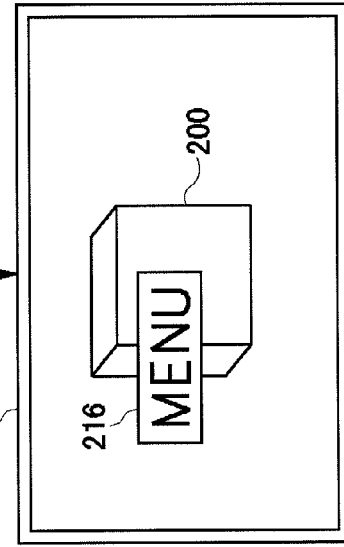

THREE-DIMENSIONAL IMAGE DISPLAY DEVICE AND THREE-DIMENSIONAL IMAGE DISPLAY METHOD FOR DISPLAYING CONTROL MENU IN THREE-DIMENSIONAL IMAGE

BACKGROUND OF THE INVENTION

1. Field of the Invention

The present invention relates to a three-dimensional image display device and a three-dimensional image display method.

2. Description of the Related Art

Recently, the performance of consumer television is improving and three-dimensional television sets capable of presenting stereoscopic images with depth are becoming available to the public. Unlike the conventional television displaying two-dimensional images, three-dimensional television presents images with depth in the antero-posterior direction.

A menu for adjusting image quality using on-screen display (OSD) or a menu for a control system of three-dimensional television should be displayed superimposed in the stereoscopic images being played back. The user viewing the stereoscopic images should adjust the focus of the eyes in accordance with the depth of the images. This may strain the user adjusting the focus depending on the position where the control menu is presented. In particular, the visibility of the control menu may become poor when the control menu is presented disregarding the relative positions of the stereoscopic images in the three-dimensional space.

SUMMARY OF THE INVENTION

The present invention addresses this issue and a purpose thereof is to provide a technology capable of improving the visibility of a control menu in three-dimensional television.

One embodiment of the present invention that addresses the issue is a three-dimensional image display device. The device comprises: a three-dimensional content playback unit configured to output to two or more image buffers a plurality of stereoscopic images of three-dimensional content, including a first parallax image and a second parallax image, resulting from viewing an object in a virtual three-dimensional space from different viewpoints; an interrupt request receiving unit configured to receive an interrupt request requesting that a control menu be displayed; and a control menu output unit configured to overwrite, responsive to the acquisition of an interrupt request by the interrupt request receiving unit, a drawn image of an object in a three-dimensional space with an image of an object of the control menu drawn with parallax while moving the object of the control menu in the depth direction of the virtual three-dimensional space away from the viewpoint, regardless of the relative positions of the object of the control menu and the object in the three-dimensional space.

Another embodiment of the present invention is also a three-dimensional image display device. The device comprises: a three-dimensional content playback unit configured to output to two of more image buffers a plurality of stereoscopic images of three-dimensional content, including a first parallax image and a second parallax image, resulting from viewing an object in a virtual three-dimensional space from different viewpoints; an interrupt request receiving unit configured to receive an interrupt request requesting that a control menu be displayed; a buffer duplication unit configured to copy, responsive to the acquisition of an interrupt request by the interrupt request receiving unit, content in the image buffer storing either the first parallax image or the second parallax image to the other image buffer; and a control menu output unit configured to overwrite, responsive to the acquisition of an interrupt request by the interrupt request receiving unit, display areas for the objects already drawn with an image of an object of the control menu, regardless of the relative positions of the object of the control menu and the object already drawn.

Still another embodiment of the present invention is also a three-dimensional image display device. The device comprises: a three-dimensional content playback unit configured to output to two or more image buffers a plurality of stereoscopic images of three-dimensional content, including a first parallax image and a second parallax image, resulting from viewing an object in a virtual three-dimensional space from different viewpoints; an interrupt request receiving unit configured to receive an interrupt request requesting that a control menu be displayed; a closest coordinate acquisition unit configured to acquire, responsive to the acquisition of an interrupt request by the interrupt request receiving unit, positional coordinates of the content located closest to the viewpoint in the virtual three-dimensional space for all the three-dimensional content output by the three-dimensional content playback unit; and a control menu output unit configured to output to the image buffers, responsive to the acquisition of an interrupt request by the interrupt request receiving unit, an image of an object of the control menu located nearer to the viewpoint than the positional coordinates acquired by the closest coordinate acquisition unit.

Another embodiment of the present invention is also a three-dimensional image display method. The method comprises: outputting to two or more image buffers a plurality of stereoscopic images of three-dimensional content, including a first parallax image and a second parallax image, resulting from viewing an object in a virtual three-dimensional space from different viewpoints; receiving an interrupt request requesting that a control menu be displayed; and overwriting, responsive to the acquisition of an interrupt request, a drawn image of an object in a three-dimensional space with an image of an object of the control menu drawn with parallax while moving the object of the control menu in the depth direction of the virtual three-dimensional space away from the viewpoint, regardless of the relative positions of the object of the control menu and the object in the three-dimensional space.

Still another embodiment of the present invention is also a three-dimensional image display method. The method comprises: outputting to two or more image buffers a plurality of stereoscopic images of three-dimensional content, including a first parallax image and a second parallax image, resulting from viewing an object in a virtual three-dimensional space from different viewpoints; receiving an interrupt request requesting that a control menu be displayed; copying, responsive to the acquisition of an interrupt request, content in the image buffer storing either the first parallax image or the second parallax image to the other image buffer; and overwriting, responsive to the acquisition of an interrupt request, display areas for the objects already drawn with an image of an object of the control menu, regardless of the relative positions of the object of the control menu and the object already drawn.

Yet another embodiment of the present invention is also a three-dimensional image display method. The method comprises: outputting to two or more image buffers a plurality of stereoscopic images of three-dimensional content, including a first parallax image and a second parallax image, resulting from viewing an object in a virtual three-dimensional space from different viewpoints; receiving an interrupt request requesting that a control menu be displayed; and acquiring, responsive to the acquisition of an interrupt request, positional coordinates of the content located closest to the viewpoint in the virtual three-dimensional space for all three-dimensional content output to the image buffers, and outputting to the image buffers an image of an object of the control menu located nearer to the viewpoint than the acquired positional coordinates.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a schematic view of a shutter-based three-dimensional television system in which parallax images are used;

FIG. 10A shows an example of a left-eye parallax image as displayed;

FIG. 10B shows an example of a right-eye parallax image as displayed;

FIG. 10C shows an example of a control menu presented to the left eye in the three-dimensional image display device according to the second embodiment;

FIG. 10D shows an example of a control menu presented to the left eye in the three-dimensional image display device according to the second embodiment;

DETAILED DESCRIPTION OF THE INVENTION

The invention will now be described by reference to the preferred embodiments. This does not intend to limit the scope of the present invention, but to exemplify the invention.

A description will be given of a base technology before describing an embodiment of the present invention.

(Base Technology)

Figure 1:
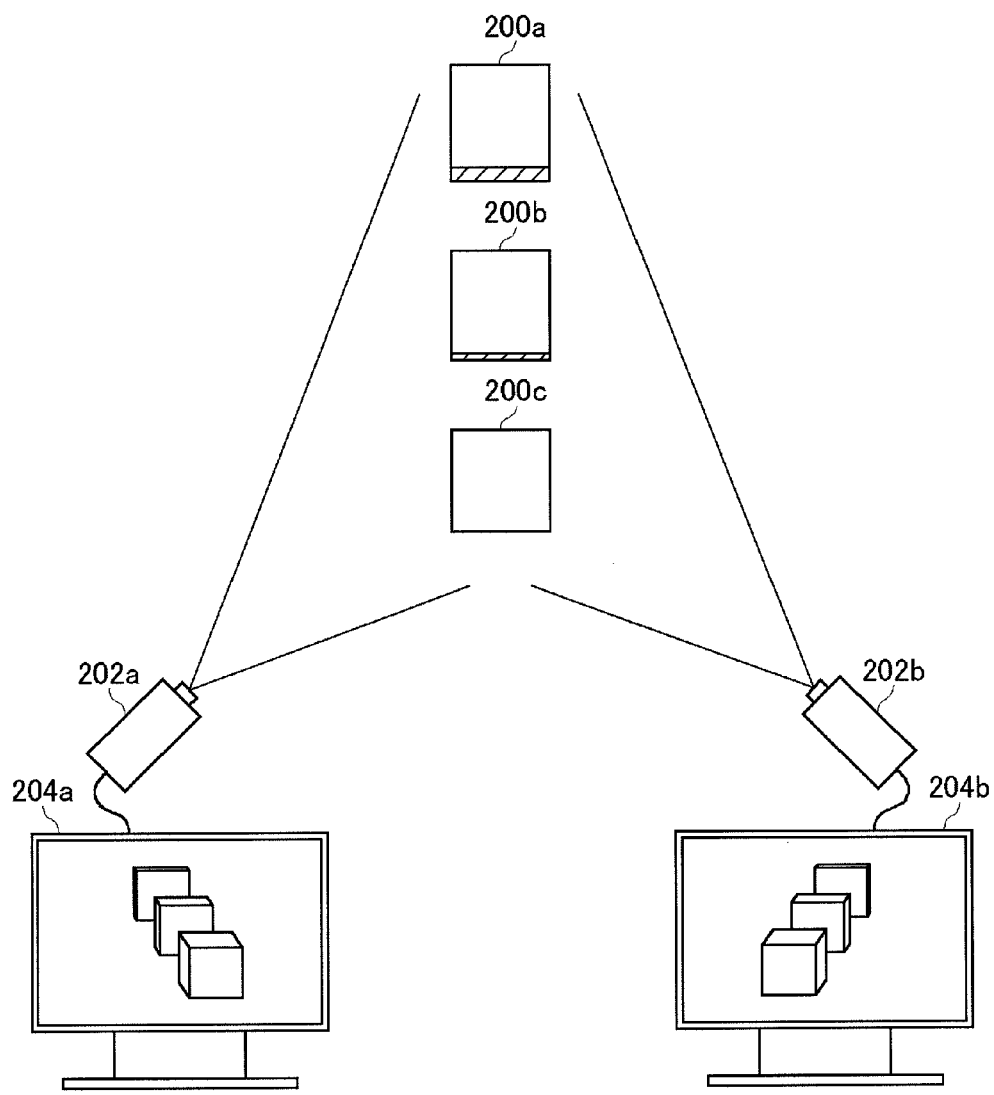
FIG. 1 shows a relation between an object and parallax images in a three-dimension space.

FIG. 1 shows a relation between an object and parallax images in a three-dimension space. In a three-dimensional space, an object 200a, an object 200b, an object 200c, which will be generically referred to as objects 200, are imaged by a left-eye camera 202a adapted to image the object 200 from left and a right-eye camera 202b adapted to image the object 200 from right, which will be generically referred to as cameras 202. Referring to FIG. 1, an image of the object 200 captured by the left-eye camera 202a and an image of the object 200 captured by the right-eye camera 202b are displayed in a monitor 204a and a monitor 204b, respectively, which will be generically referred to as two-dimensional monitors 204.

The left-eye camera 202a and the right-eye camera 202b image the object 200 from different positions. Therefore, the image displayed on the monitor 204a and the image displayed on the monitor 204b show the object 200 oriented in different directions. Images of the object 200 in a three-dimensional space as viewed from different viewpoints are referred to as "parallax images". Since human eyes are spaced apart by about 10 cm, parallax is produced between an image viewed from the left eye and an image viewed from the right eye. Human brain is said to recognize the depth of an object using parallax images perceived by the left and right eyes. For this reason, by projecting a parallax image perceived by the left eye and a parallax image perceived by the right eye to the respective eyes, an image having a depth is perceived by a person.

Various methods are used to implement three-dimensional television for presenting an image with depth to people. In this embodiment, a description will be given of shutter-based three-dimensional television alternately displaying a parallax image for the left eye and a parallax image for the right eye in a time-divided manner. FIG. 2 is a schematic view of a shutter-based three-dimensional television system 300 utilizing parallax images. The three-dimensional television system 300 comprises a three-dimensional television 206 for projecting parallax images, shutter glasses 210 used to view parallax images, and a glass driving signal origination unit 208 for synchronizing the three-dimensional television 206 and the shutter glasses 210.

The three-dimensional television 206 alternately presents the left-eye parallax image and the right-eye parallax image in a time-division manner. The glass driving signal origination unit 208 originates an infrared synchronization signal indicating the timing of display of the parallax images in the three-dimensional television 206. The shutter glasses 210 is provided with a receiver (not shown) for receiving a synchronizing signal transmitted from the glass driving signal origination unit 208 and shutters the left or right lens in accordance with the received synchronizing signal. The shutter is implemented by using the known technology of liquid crystal shutters.

More specifically, when the three-dimensional television 206 displays a left-eye parallax image, the shutter glasses 210 receive a signal for closing the shutter of the right eye lens from the glass driving signal origination unit 208. The shutter glasses 210 shield an image entering the right eye by closing the shutter of the right eye lens in accordance with the received signal. This results in only the left-eye parallax image being projected to the left eye of the user when the three-dimensional television 206 displays the left-eye parallax image. Conversely, when the three-dimensional television 206 displays the right-eye parallax image, only the right-eye parallax image is projected to the right eye of the user by allowing the shutter glasses 210 to close the shutter of the left eye lens.

Figure 3:
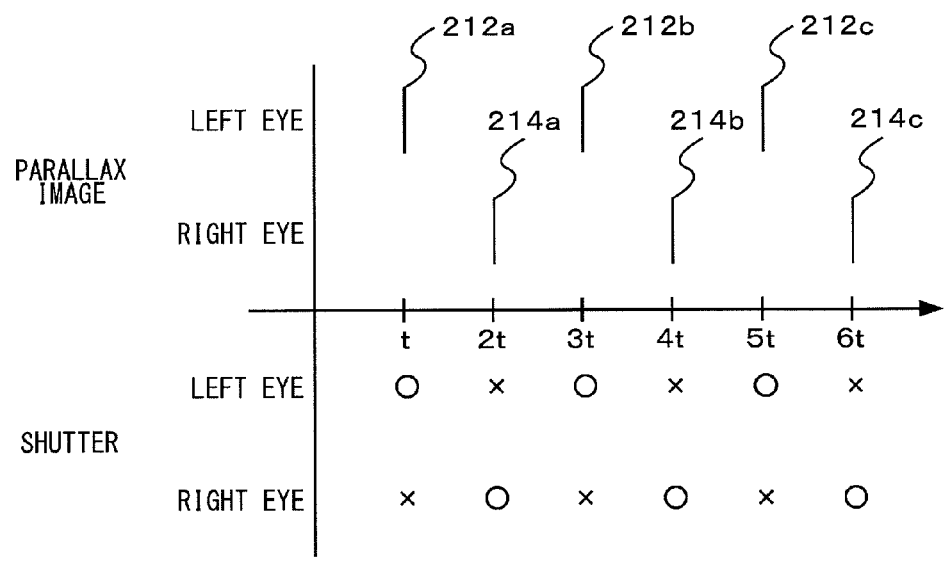
FIG. 3 shows a relation between the timing of driving the shutter of the shutter glasses and the timing of displaying parallax images in three-dimensional television.

FIG. 3 shows a relation between the timing of driving the shutter of the shutter glasses 210 and the timing of displaying parallax images in the three-dimensional television 206. A left-eye parallax image 212a, a left-eye parallax image 212b, a left-eye parallax image 212c, which are generically referred to as left-eye parallax images 212, and a right-eye parallax image 214a, a right-eye parallax image 214b, and a right-eye parallax image 214c, which are generically referred to as right-eye parallax images 214, are alternately displayed at a predetermined interval t (e.g., 1/120 sec).

When the left-eye parallax image 212a is being displayed, the left-eye shutter of the shutter glasses 210 is open and the right-eye shutter is closed. Referring to FIG. 3, the open state of the shutter of the shutter glasses 210 is indicated by "O" and the closed state is indicated by "X". As shown in FIG. 3, three-dimensional images with depth are presented to the user by synchronizing the display of parallax images in the three-dimensional television 206 and the opening/closing of the shutter glasses 210 such that the left-eye parallax images 212 are projected to the left eye of the user and the right-eye parallax images 214 are projected to the right eye.

Figure 4:
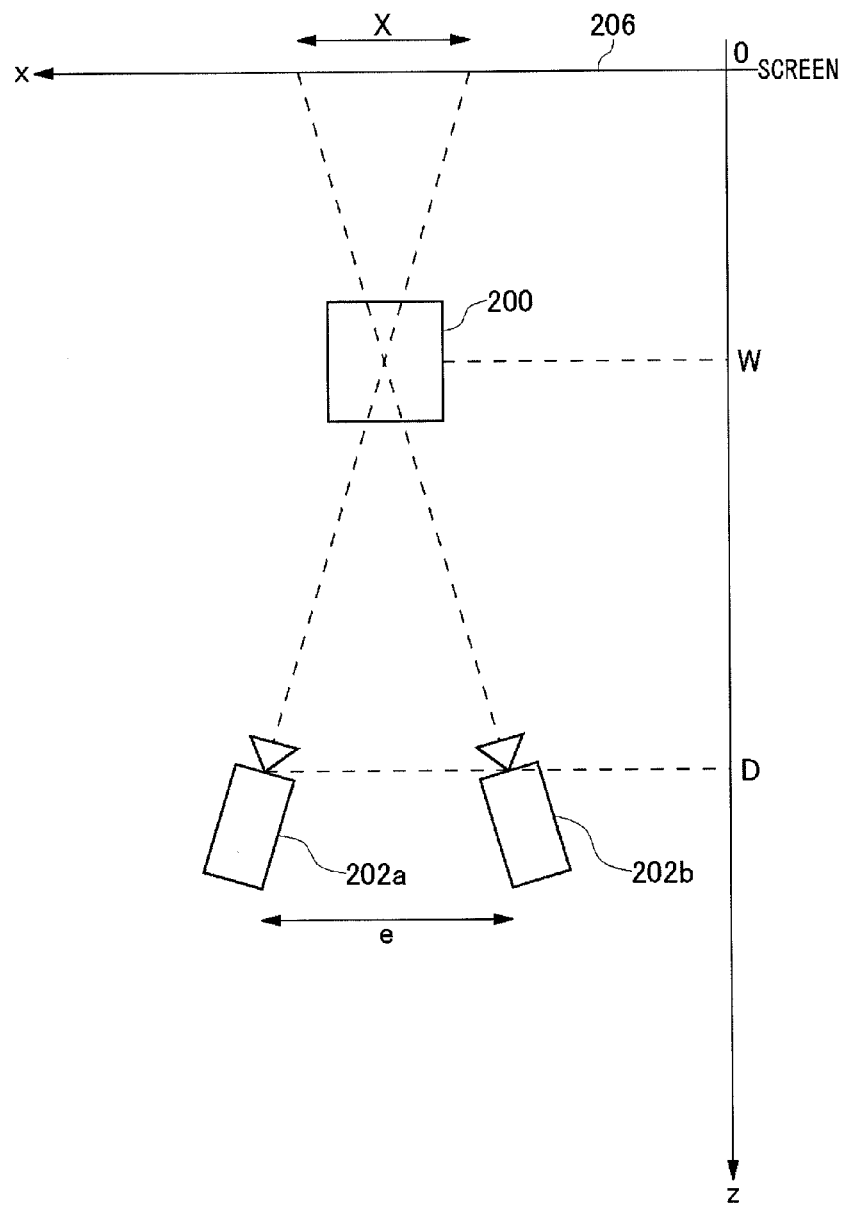
FIG. 4 shows parameters necessary to compute parallax.

FIG. 4 shows parameters necessary to compute parallax. Given a virtual three-dimensional space displayed by the three-dimensional television 206 (hereinafter, simply referred to as "three-dimensional space"), a coordinate system is defined using an arbitrary point in the display screen of the three-dimensional television 206 (e.g., the bottom right point in the display screen of the three-dimensional television 206 as installed) as the original, the transversal direction of the display screen as the x-axis, and the vertical direction as the y-axis, and the direction perpendicular to the display screen of the three-dimensional television 206 as the z-axis. FIG. 4 shows the three-dimensional space displayed by the three-dimensional television 206 viewed in a direction parallel with the y-axis.

Parallax X that should be reflected in the display screen of the three-dimensional television 206 is computed based on the z coordinate W of the object 200 in the three-dimensional space. Parameters necessary to compute parallax include a distance D in the three-dimensional space between the left-eye camera 202a or the right-eye camera 202b and the display screen, an average value e of the space between human eyes, and a size of the display screen of the three-dimensional television 206. It is assumed that the left-eye camera 202a and the right-eye camera 202b are located at positions in the three-dimensional space spaced apart by the average value e of the space between human eyes.

Using the parameters noted above, the ratio between the z-coordinate W of the object 200 in the three-dimensional space and the distance D in the three-dimensional space between the camera 202 and the display screen are computed. Parallax X on the display screen of the three-dimensional television 206 is computed based on the ratio and the average value e between human eyes. Finally, parallax X is converted into the unit of the coordinate system in the three-dimensional space based on the size of the display screen of the three-dimensional television 206. It is ensured that parallax is zero when the object 200 is located on the display screen of the three-dimensional television 206. In this case, the left-eye parallax image and the right-eye parallax image of the object 200 located on the display screen of the three-dimensional television 206 are identical.

With the technology described above as the basis, a description will now be given of the embodiment.

The embodiment relates to a method of displaying the system's control menu for playing back content while content including three-dimensional images of games or movies are being played back in the three-dimensional television 206. The term "control menu" denotes information presented to the user by the system program for centrally controlling a device for playing back content and running an application program such as content. For example, a control menu includes information not related to the content played back but related to the operation of the playback device. For example, the menu allows selection of whether the playback of the content should be stopped or not, gives an alert indicating that the free space in a memory card is insufficient for the user to save game content, gives an alert indicating that the remaining battery power is low in the case that the playback device is of mobile type operated by a built-in battery.

First Embodiment

A summary of the first embodiment will be described. In the first embodiment, a control menu is displayed while content including three-dimensional images of games or movies are being played back in the three-dimensional television 206 such that an object of a control menu is defined in the three-dimensional space and is drawn while moving the object away from the viewpoint in the depth direction. In the eyes of the user, it looks as if the system menu comes entering the three-dimensional space moving away from the user.

Figure 5:
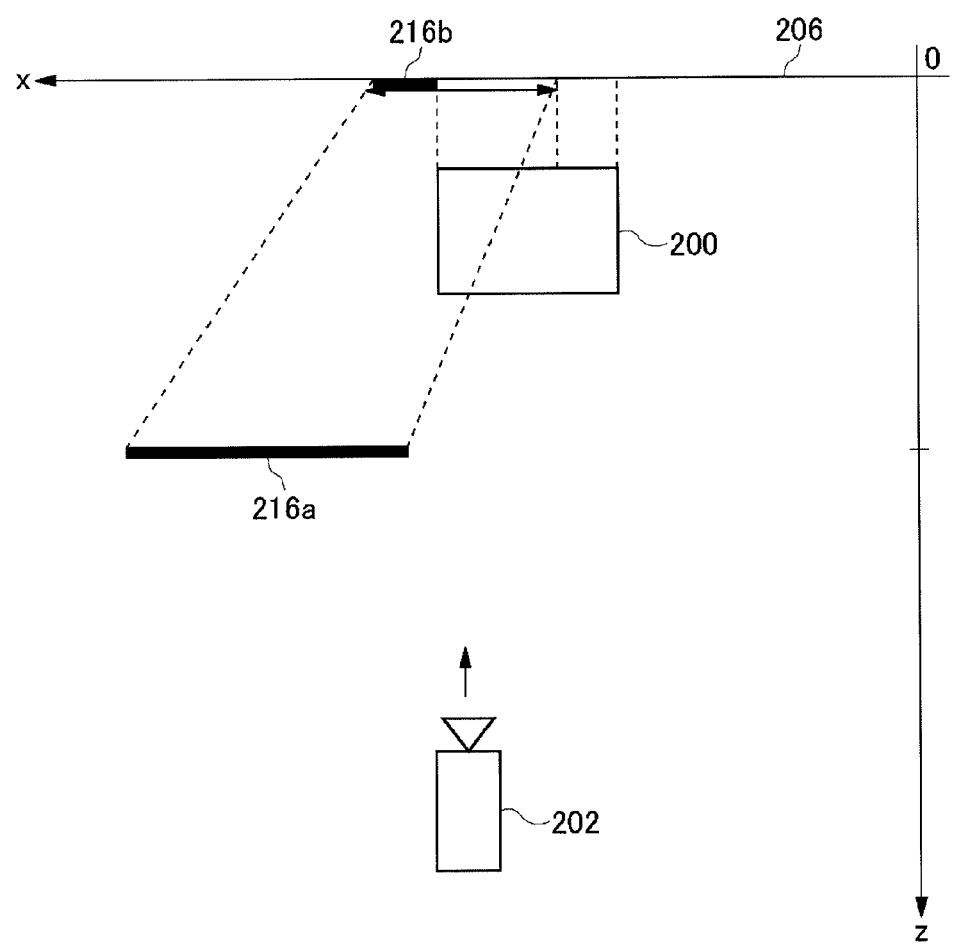
FIG. 5 shows the relative positions of an object of a control menu and another object in a virtual three-dimensional space.

FIG. 5 shows the relative positions of an object 216 of the control menu and the other object 200 in the three-dimensional space. As shown in FIG. 5, an object 216a of the control menu, which could be one of objects generically referred to as objects 216 of the control menu, appears more toward the viewpoint in the three-dimensional space than the object 200, moving in the direction of sight until it reaches the position of an object 216b of the control menu. The relative positions of the object 216b of the control menu and the other object 200 as viewed from the camera 202 placed at the viewpoint in the three-dimensional space is such that the object 200 is located more toward the viewpoint.

Figure 6A:
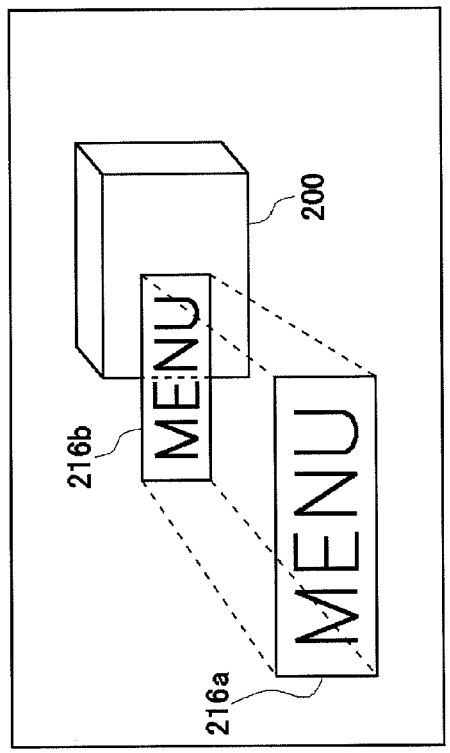
FIG. 6A shows how the object of the control menu is displayed depending on its position relative to the other object.

FIG. 6A shows how the object 216b of the control menu is displayed depending on its position relative to the other object 200. Since the object 216b of the control menu is located behind the other object 200 as viewed from the camera 202, the object 216b of the control menu is hidden by the object 200.

As described above, the control menu is often used to present important information related to the operation of the device for playing back content to the user. Therefore, disadvantage may be caused if the object 216b of the control menu is shielded from view by being hidden by the object 200. The first embodiment addresses this disadvantage by overwriting the image of the other object 200 with the object 216 of the control menu irrespective of the relative positions of the object 216 of the control menu and the other object 200.

Figure 6B:
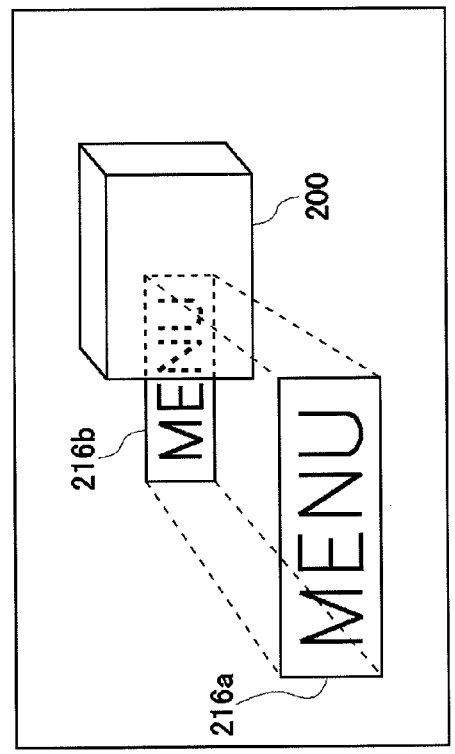
FIG. 6B shows how the control menu is displayed in a three-dimensional image display device according to the first embodiment by way of example.

FIG. 6B shows how the control menu is displayed in a three-dimensional image display device 100 according to the first embodiment by way of example. Even if the object 216a of the control menu appears more toward the viewpoint in the three-dimensional space than the object 200 and moves behind the object 200, the object 200 is overwritten with the object 216 of the control menu. This allows the user to view the object 216 of the control menu irrespective of its position relative to the other object 200.

When the object 216 of the control menu is drawn regardless of the relative positions of the object 216 and the other object 200 in the three-dimensional space, the user may feel uneasy viewing the objects. As shown in FIG. 5 and FIGS. 6A-6B, the user may feel as if the camera 202 capturing the image of the other object 200 is pulled toward the user, by displaying the object 216 of the control menu toward the camera 202, which represents the viewpoint, and then moving the object 216 in the direction of sight. This illusion helps reduce the uneasiness felt by the viewing user even if the relative positions of the object 216 of the control menu and the other object 200 is not accurately displayed.

The position of appearance of the object 216a of the control menu may be experimentally determined so as to reduce the uneasiness in viewing. By moving the object 216b of the control menu to the position aligned with the display screen of the three-dimensional television 206 as shown in FIG. 5, the user can view the control menu clearly without wearing the shutter glasses 210. This is because the left-eye parallax image and the right-eye parallax image of the object 216b of the control menu will be identical if the object 216b is located on the display screen of the three-dimensional television 206.

Figure 7:
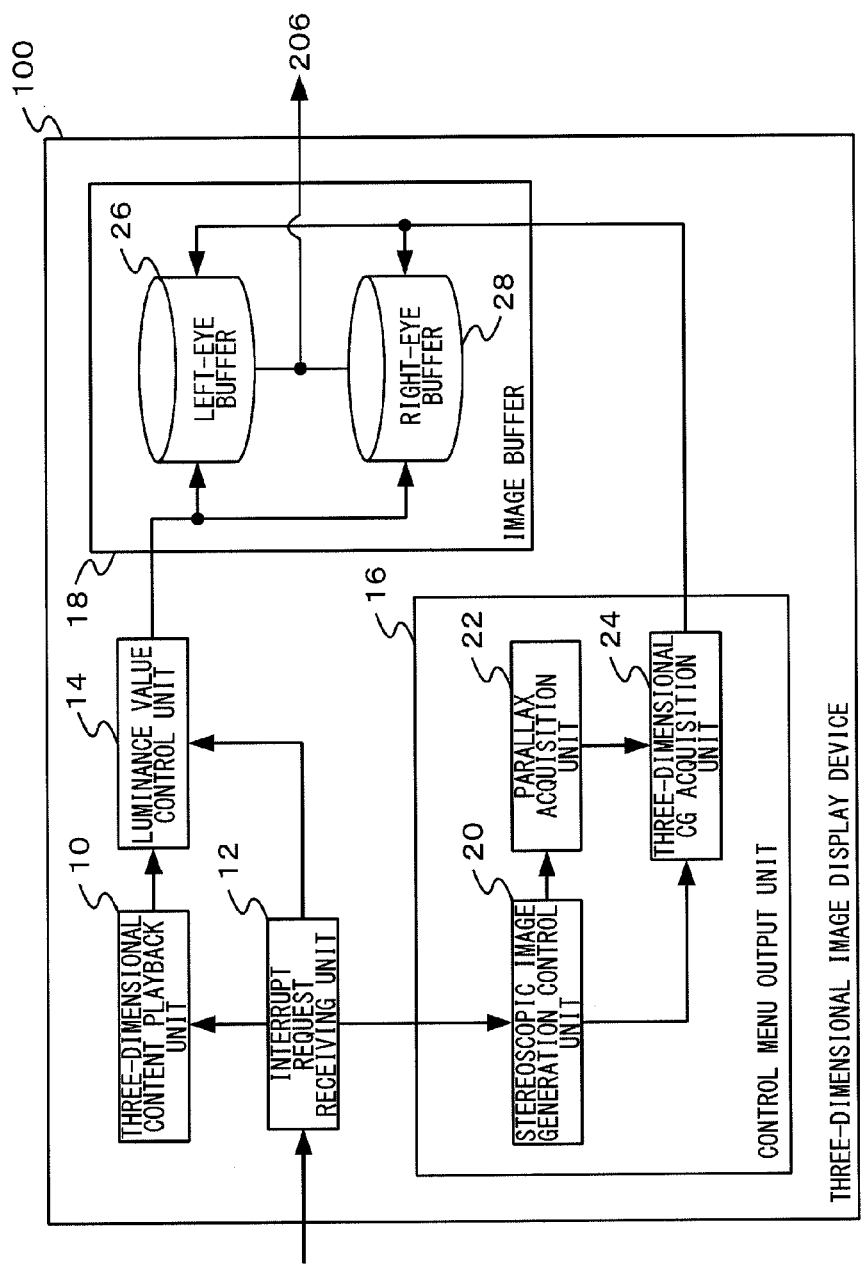
FIG. 7 schematically shows the functions of the three-dimensional image display device according to the first embodiment.

FIG. 7 schematically shows the functions of the three-dimensional image display device 100 according to the first embodiment. The three-dimensional image display device 100 according to the first embodiment comprises a three-dimensional content playback unit 10, an interrupt request receiving unit 12, a luminance value control unit 14, a control menu output unit 16, and an image buffer 18.

The three-dimensional content playback unit 10 outputs to the image buffer 18 stereoscopic images of three-dimensional content (hereinafter, referred to as "stereoscopic images") including the left-eye parallax image and the right-eye parallax image resulting from viewing an object in the three-dimensional space from different viewpoints. Therefore, the image buffer 18 includes a left-eye buffer 26 and a right-eye buffer 28. The left-eye buffer 26 stores the left-eye parallax image and the right-eye buffer 28 stores the right-eye parallax image. The parallax images stored in the left-eye buffer 26 and the right-eye buffer 28 are read by an image drawing unit of the three-dimensional television 206 and alternately displayed on the display screen of the three-dimensional television 206 as described above.

The interrupt request receiving unit 12 receives an interrupt request requesting that a control menu be displayed. For example, an interrupt request is generated when the user presses a predetermined button of the controller (not shown) of the three-dimensional image display device 100 or generated by the operating system run in the three-dimensional image display device 100 when the free space in the memory card is insufficient.

Responsive to the acquisition of an interrupt request by the interrupt request receiving unit 12, the control menu output unit 16 overwrites the image of the other object 200 in the three-dimensional space stored in the buffer 18 with the object 216 of the control menu, while moving the object 216 away from the viewpoint in the three-dimensional space in the depth direction, irrespective of the relative positions of the object 216 and the other object in the three-dimensional space. For this purpose, the control menu output unit 16 comprises a stereoscopic image generation control unit 20, a parallax acquisition unit 22, and a three-dimensional computer graphics (CG) acquisition unit 24.

The stereoscopic image generation control unit 20 places the object 216 of the control menu in the three-dimensional space, as shown in FIG. 5 and FIGS. 6A-6B. The parallax acquisition unit 20 computes the parallax associated with the object 216 of the control menu in the three-dimensional space occurring when the object 216 is viewed from the left-eye camera 202a and the right-eye camera 202b placed in the three-dimensional space. Based on the parallax acquired by the parallax acquisition unit 22, the three-dimensional CG acquisition unit 24 projects the object 216 of the control menu in the three-dimensional space so as to generate a two-dimensional buffer, overwriting the image buffer 18 accordingly.

Responsive to the acquisition of an interrupt request by the interrupt request receiving unit 12, the luminance value control unit 14 lowers the luminance value of the stereoscopic images other than the object 216 of the control menu. More specifically, the unit 14 lowers the luminance values of the parallax images output by the three-dimensional content playback unit 10 to half and stores the values in the image buffer 18. In combination with the aforementioned illusion produced by moving the object 216 away from the viewpoint so that it looks as if the camera 202 imaging the object is pulled toward the user, reduction in luminance further reduces the uneasiness felt by the viewing user as a result of disregarding the relative positions. This is advantageous in enhancing the visibility of the control menu relative to other stereoscopic images.

The three-dimensional content playback unit 10 may suspend the playback of content responsive to the acquisition of an interrupt request by the interrupt request receiving unit 12. This advantageous in that uneasiness felt by the viewing user is further reduced since only the control menu is moved.

FIG. 7 shows functional components to implement the three-dimensional image display device 100 according to the first embodiment and the other components are omitted. The elements depicted in FIG. 7, etc. as functional blocks for performing various processes are implemented in hardware by a CPU, main memory, or other LSI's (large-scale intergration circuits), and in software by a program etc., loaded into the main memory. Therefore, it will be obvious to those skilled in the art that the functional blocks may be implemented in a variety of manners by hardware only, software only, or a combination of thereof.

Figure 8:
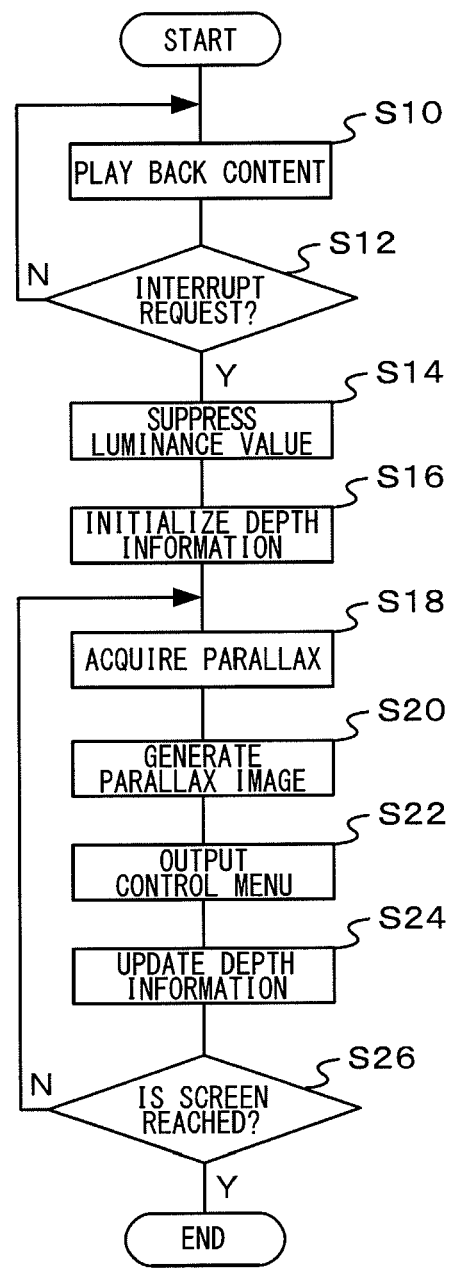
FIG. 8 is a flowchart showing the steps for displaying images performed in the three-dimensional image display device according to the first embodiment.

FIG. 8 is a flowchart showing the steps for displaying images performed in the three-dimensional image display device 100 according to the first embodiment. Referring to the flowchart, each step performed is denoted by a combination of S (initial letter of Step), which indicates "step", and a numeral. When a determination is performed in a step denoted by a combination of S and a numeral and when the result of determination is affirmative, Y (initial letter of Yes) is used to indicate the affirmative determination (e.g., Y in S12). Conversely, when the result of determination is negative, N (initial letter of No) is used to indicate the negative determination (e.g., N in S12). The steps in the flowchart are started when the three-dimensional content playback unit 10 starts playing back stereoscopic images.

The three-dimensional content playback unit 10 plays back stereoscopic images of three-dimensional content (S10). When the interrupt request receiving unit 12 does not receive an interrupt request (N in S12), three-dimensional content playback unit 10 continues to play back stereoscopic images. When the interrupt request receiving unit 12 receives an interrupt request (Y in S12), the luminance value control unit 14 suppresses the luminance value of the stereoscopic images other than the object 216 of the control menu (S14).

The stereoscopic image generation control unit 20 initializes the depth of the object 216 of the control menu, by placing the object at the position of the object 216a of the control menu shown in FIGS. 5 and 6A-6B (S16). The parallax acquisition unit 22 computes and acquires the parallax associated with the object 216 of the control menu in the three-dimensional space occurring when the object 216 is viewed from the left-eye camera 202a and the right-eye camera 202b placed in the three-dimensional space (S18). The three-dimensional CG acquisition unit 24 projects the object 216 of the control menu in the three-dimensional space based on the parallax acquired by the parallax acquisition unit 22 and generates parallax images accordingly (S20). The three-dimensional CG acquisition unit 24 overwrite the buffer 18 with the generated parallax images of the control menu and outputs the content of the buffer (S22).

The stereoscopic image generation control unit 20 moves the object 216 of the control menu in the three-dimensional space by a predetermined distance in the direction of sight and updates the depth information accordingly (S24). For example, the predetermined distance is defined as a distance obtained by dividing the space between the object 216a of the control menu and the object 216b of the control menu, which are shown in FIGS. 5 and 6A-6B, by ten.

While the object 216 of the control menu has not reached the position on the display screen of the three-dimensional television 206 (N in S26), the steps for generating parallax images of the control menu (steps S18 through S24 described above) are repeated. When the object 216 of the control menu reaches the position on the display screen of the three-dimensional television 206 (Y in S26) as a result of updating of the position of the object 216 of the control menu performed by the stereoscopic image generation control unit 20, the process according to the flowchart is terminated.

The device with the configuration described above operates as follows. The user plays back stereoscopic images using the three-dimensional image display device 100 according to the first embodiment. When the interrupt request receiving unit 12 acquires an interrupt request (e.g., the user's request to suspend the playback of content), the control unit output unit 16 displays the control menu, moving the menu away in the depth direction of the three-dimensional space.

As described above, according to the first embodiment, the user can view the control menu at any time by overwriting the other object 200 with the control menu and displaying the menu accordingly. By displaying the control menu such that the menu moves away in the depth direction of the three-dimensional space, resultant illusion helps improve the visibility of the control menu even if the control menu is displayed regardless of the relative positions of the object 216 of the control menu and the other object 200. By ultimately displaying the control menu at the position, in the three-dimensional space, on the display screen of the three-dimensional television 206, the user can clearly view the control menu without wearing the shutter glasses 210.

Second Embodiment

A summary of the second embodiment will be described. According to the second embodiment, a control menu is displayed while the three-dimensional television 206 is playing back content that include stereoscopic images of games and movies such that the right-eye parallax image is replaced by the left-eye parallax image and displayed accordingly. The displayed image is then overwritten with the control menu and the resultant image is displayed. The user experiences no parallax between the images entering the left and right eyes. Therefore, the visibility of the image as a whole, including the control menu, is improved.

Figure 9:
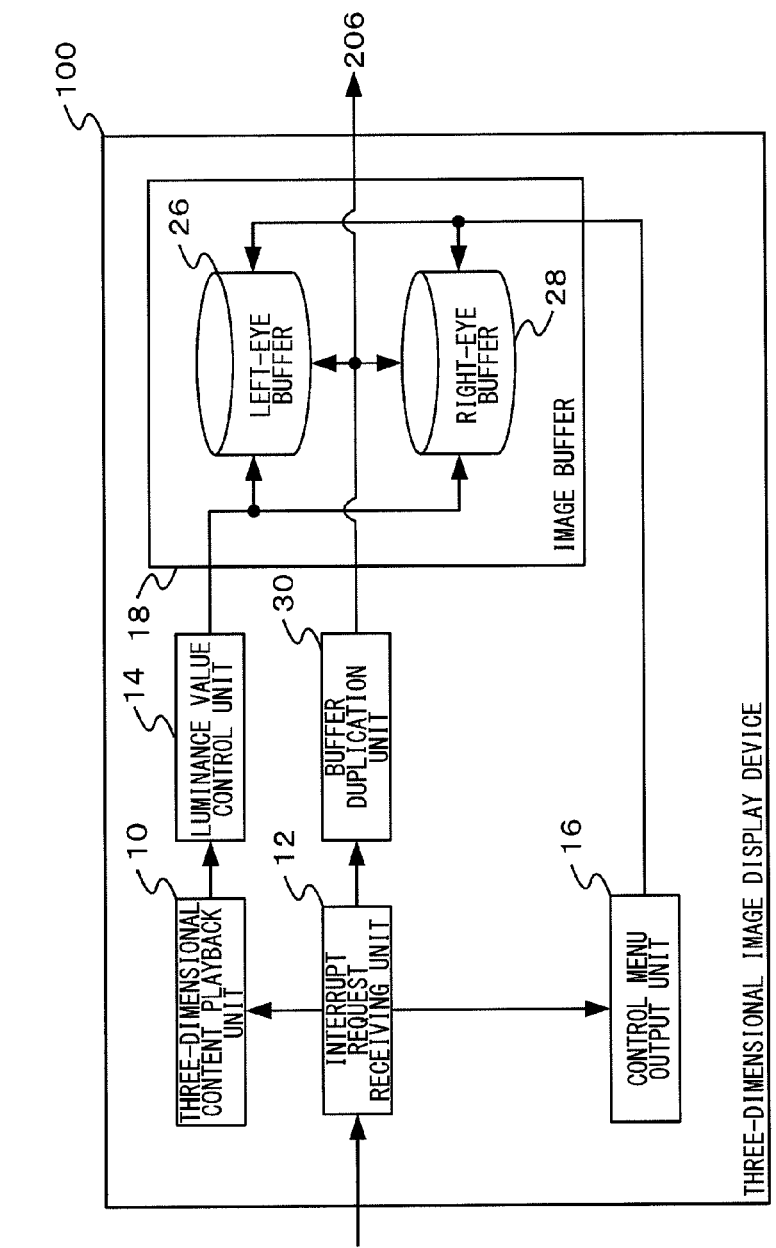
FIG. 9 schematically shows the functions of the three-dimensional image display device according to the second embodiment.

FIG. 9 schematically shows the functions of the three-dimensional image display device 100 according to the second embodiment. The three-dimensional image display device according to the second embodiment comprises a three-dimensional content playback unit 10, an interrupt request receiving unit 12, a luminance value control unit 14, a buffer duplication unit 30, a control menu output unit 16, and an image buffer 18. The image buffer 18 includes a left-eye buffer 26 and a right-eye buffer 28. Hereinafter, description of those aspects of the second embodiment that are also found in the first embodiment will be omitted.

Responsive to the acquisition of an interrupt request by the interrupt request receiving unit 12, the buffer duplication unit 30 overwrites the left-eye parallax image stored in the right-eye buffer 26 with the right-eye parallax image stored in the left-eye buffer 28 using duplication. Responsive to the acquisition of an interrupt request by the interrupt request receiving unit 12, the control menu output unit 16 overwrites display areas in the left-eye buffer 26 and the right-eye buffer 28 storing the left-eye parallax image with the image of the object 216 of the control menu.

FIG. 9 shows functional components to implement the three-dimensional image display device 100 according to the second embodiment and the other components are omitted. The elements depicted in FIG. 9, etc. as functional blocks for performing various processes are implemented in hardware by a CPU, main memory, or other LSI's, and in software by a program etc., loaded into the main memory. Therefore, it will be obvious to those skilled in the art that the functional blocks may be implemented in a variety of manners by hardware only, software only, or a combination of thereof.

FIG. 10A shows an example of a left-eye parallax image stored in the left-eye buffer 26. FIG. 10B shows an example of a right-eye parallax image stored in the right-eye buffer 28. As shown in FIGS. 10A and 10B, before the interrupt request receiving unit 12 receives an interrupt request, the left-eye parallax image and the right-eye parallax image are images resulting from viewing an object from different angles.

When the interrupt request receiving unit 12 receives an interrupt request, the buffer duplication unit 30 overwrites the right-eye parallax image stored in the right-eye buffer 28 with the left-eye parallax image stored in the left-eye buffer 26. The control menu output unit 16 overwrites display areas in the left-eye buffer 26 and the right-eye buffer 28 with the image of the object 216 of the control menu.

FIG. 10C shows an example of a control menu presented to the left eye in the three-dimensional image display device 100 according to the second embodiment. FIG. 10D shows an example of a control menu presented to the right eye in the three-dimensional image display device 100 according to the second embodiment. As shown in FIGS. 10A and 10B, the left-eye parallax image stored in the left-eye buffer 26 and the right-eye parallax image stored in the right-eye buffer 28 are identical.

As a result of the buffer duplication 30 overwriting the right-eye parallax image stored in the right-eye buffer 28 with the left-eye parallax image stored in the left-eye buffer 26, the left-eye parallax image is projected to the left and right eyes of the user. For this reason, an ordinary two-dimensional image with depth information lost is presented to the eyes of the user. When an ordinary two-dimensional image with no depth information is overwritten with the control menu, the visibility of the control menu is advantageously improved as compared to the case where a stereoscopic image with depth is overwritten at a certain position with the control menu since the user does not have to adjust the focus of the eyes. In this case, the user can clearly view the entirety of the image, including the control menu, without wearing the shutter glasses 210.

In the above description, it is assumed that the buffer duplication unit 30 overwrites the right-eye parallax image stored in the right-eye buffer 28 with the left-eye parallax image stored in the left-eye buffer 26. Alternatively, the buffer duplication unit 30 may overwrite the left-eye parallax image stored in the left-eye buffer 26 with the right-eye parallax image stored in the right-buffer 28. Either approach serves the purpose so long as the images projected to the eyes of the user are identical. What is essential is that the image stored in one of the image buffers in the image buffer 18 is copied to the other image buffer.

Figure 11:
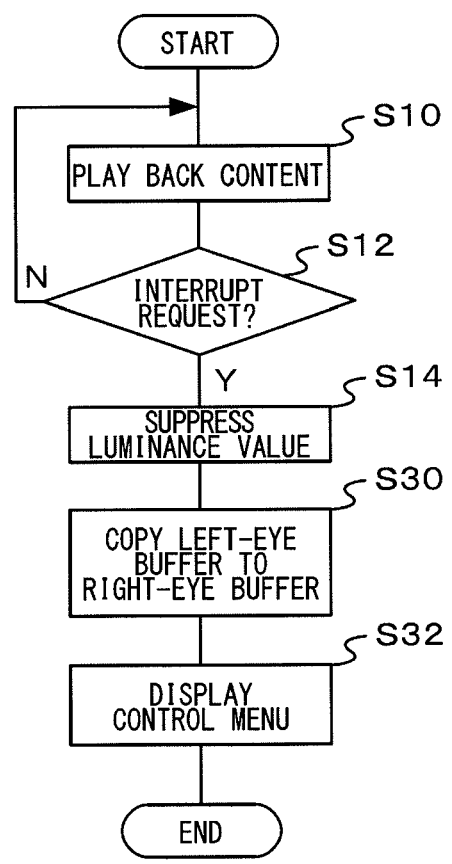
FIG. 11 is a flowchart showing the steps for displaying images performed in three-dimensional image display according to the second embodiment.

FIG. 11 is a flowchart showing the steps for displaying images performed in the three-dimensional image display device 100 according to the second embodiment. The steps in the flowchart are started when the three-dimensional content playback unit 10 starts playing back stereoscopic images.

The three-dimensional content playback unit 10 plays back stereoscopic images of three-dimensional content (S10). When the interrupt request receiving unit 12 does not receive an interrupt request (N in S12), three-dimensional content playback unit 10 continues to play back stereoscopic images. When the interrupt request receiving unit 12 receives an interrupt request (Y in S12), the luminance value control unit 14 suppresses the luminance value of the stereoscopic images other than the object 216 of the control menu (S14).

The buffer duplication unit 30 overwrites the right-eye parallax image stored in the right-eye buffer 28 with the left-eye parallax image stored in the left-eye buffer 26 using duplication (S30). The control menu output unit 16 displays the control menu by overwriting display areas in the left-eye buffer 26 and the right-eye buffer 28 with the image of the object 216 of the control menu (S32). When the control menu output unit 16 outputs the control menu, the process according to the flowchart is terminated.

The device with the configuration described above operates as follows. The user plays back stereoscopic images using the three-dimensional image display device 100 according to the second embodiment. When the interrupt request receiving unit 12 acquires an interrupt request (e.g., the user's request to suspend the playback of content), parallax-free images are presented to the user as a result of the buffer duplication 30 overwriting the right-eye parallax image stored in the right-eye buffer 28 with the left-eye parallax image stored in the left-eye buffer 26 using duplication. The control menu output unit 16 further overwrites the parallax-free images with the control menu.

As described above, according to the second embodiment, parallax between the left-eye image and the right-eye image presented to the user is eliminated so that the visibility of the control menu is improved. Further, the user can clearly view the control menu without wearing the shutter glasses 210.

Third Embodiment

A summary of the third embodiment will be described. According to the third embodiment, a control menu is displayed while the three-dimensional television 206 is playing back content that include stereoscopic images of games and movies such that the depth of the content being played back is acquired so that the control menu is displayed more toward the viewpoint than the content located closest to the viewpoint. Since this creates no inconsistency between position of the object 216 of the control menu and that of the object 200 as they are displayed in the three-dimensional space, the user viewing the control menu does not feel uneasy.

Figure 12:
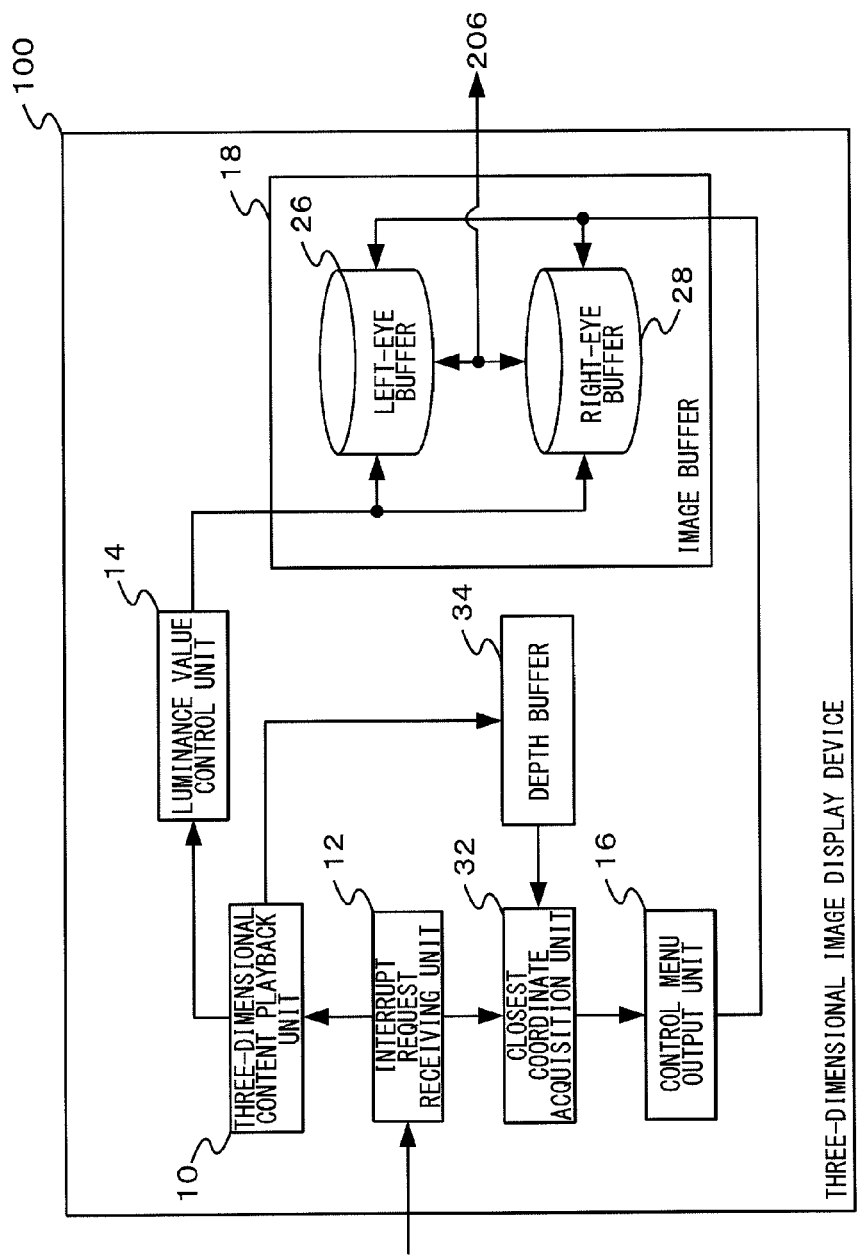
FIG. 12 schematically shows the functions of the three-dimensional image display device according to the third embodiment.

FIG. 12 schematically shows the functions of the three-dimensional image display device 100 according to the third embodiment. The three-dimensional image display device according to the third embodiment comprises a three-dimensional content playback unit 10, an interrupt request receiving unit 12, a luminance value control unit 14, a closest coordinate acquisition unit 32, a depth buffer 34, a control menu output unit 16, and an image buffer 18. The image buffer 18 includes a left-eye buffer 26 and a right-eye buffer 28. Hereinafter, description of those aspects of the third embodiment that are also found in the first and second embodiments will be omitted.

The depth buffer 34 acquires and stores depth information of stereoscopic images being played back from the three-dimensional content playback unit 10. The term "depth information of stereoscopic images" refers to the coordinate in the depth direction of the three-dimensional space corresponding to the pixels in a two-dimensional image produced by projecting the object 200 placed in the three-dimensional space. More specifically, the information represents the coordinate in the z axis in FIG. 4 corresponding to each pixel in the two-dimensional image.

For this reason, a depth buffer may be called "z buffer".

Responsive to the acquisition of an interrupt request by the interrupt request receiving unit 12, the closest coordinate acquisition unit 32 refers to the depth buffer 34 and acquires the positional coordinates of the object 200 located closest to the viewpoint in the three-dimensional space (hereinafter, referred to as "closest spot coordinate"), of all the objects 200 in the three-dimensional content output by the three-dimensional content playback unit 10.

Responsive to the acquisition of an interrupt request by the interrupt request receiving unit 12, the control menu output unit 16 outputs the image of the object 216 more toward the viewpoint than the closest spot coordinate acquired by the closest coordinate acquisition unit 32.

FIG. 12 shows functional components to implement the three-dimensional image display device 100 according to the third embodiment and the other components are omitted. The elements depicted in FIG. 12, etc. as functional blocks for performing various processes are implemented in hardware by a CPU, main memory, or other LSI's, and in software by a program etc., loaded into the main memory. Therefore, it will be obvious to those skilled in the art that the functional blocks may be implemented in a variety of manners by hardware only, software only, or a combination of thereof.

Figure 13B:
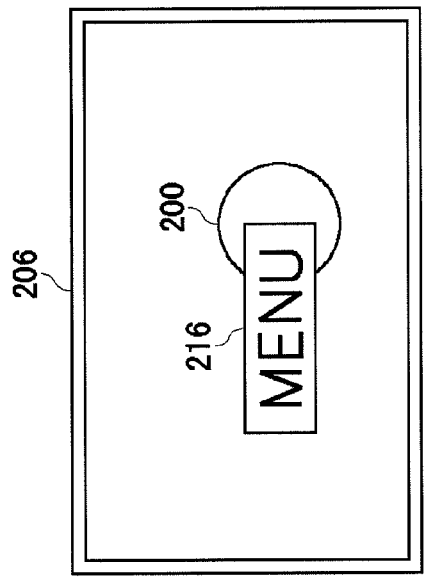
FIG. 13B shows an example of the control menu displayed in the three-dimensional image display device according to the third embodiment.
Figure 13A:
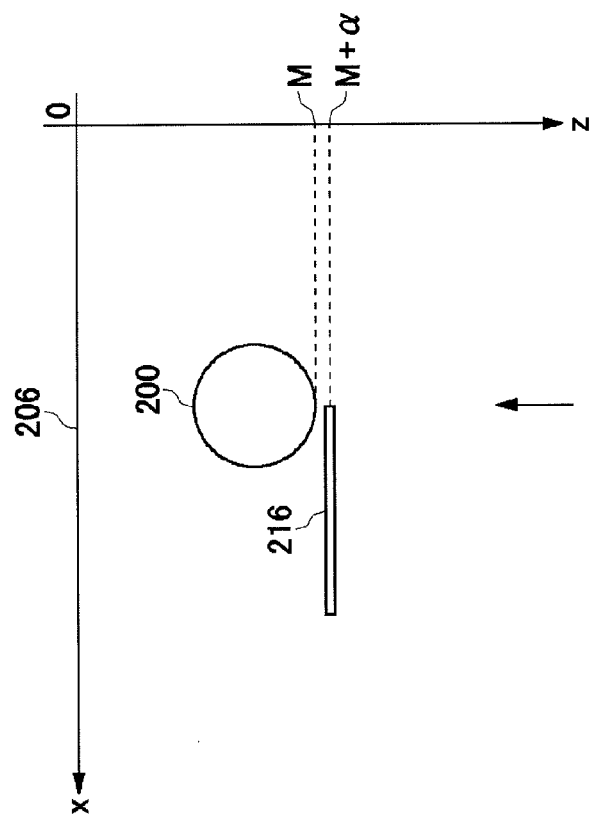
FIG. 13A shows the relative positions of the object of the control menu and the other object in the three-dimensional space as displayed by the three-dimensional image display device according to the third embodiment.

FIG. 13A shows the relative positions of the object 216 of the control menu and the other object 200 in the three-dimensional space as displayed in the three-dimensional image display device 100 according to the third embodiment.

Responsive to the acquisition of an interrupt request by the interrupt request receiving unit 12, the closest coordinate acquisition unit 32 refers to the depth buffer 34 storing the depth information on the object 200 located in the three-dimensional space so as to acquire the closest spot coordinate (coordinate M in FIG. 13A). Responsive to the acquisition of an interrupt request by the interrupt request receiving unit 12, the control menu output unit 16 outputs to the image buffer 18 the image of the object 216 of the control menu located more toward the viewpoint, i.e., at a coordinate M+a in FIG. 13A, than the closest spot coordinate M.

FIG. 13B shows an example of the control menu displayed in the three-dimensional image display device 100 according to the third embodiment. As shown in FIG. 13A, the object 216 of the control menu is located more toward the viewpoint than the object 200 so that the image of the object 216 of the control menu is displayed closest to the viewpoint.

Figure 14:
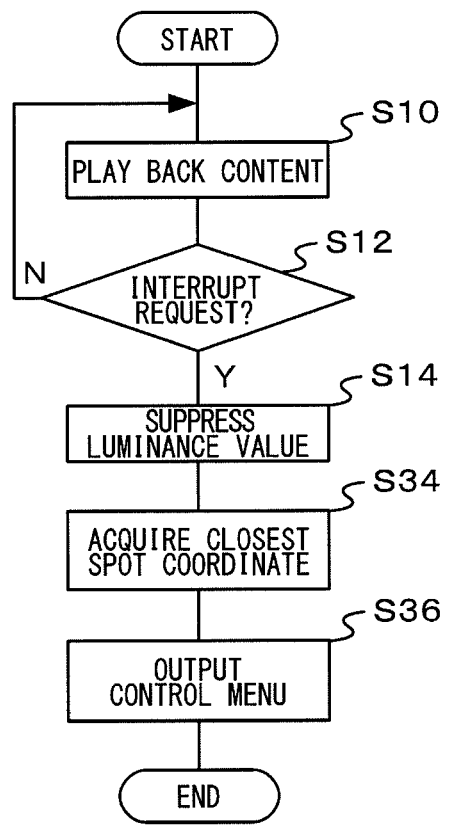
FIG. 14 is a flowchart showing the steps for displaying images performed in three-dimensional image display according to the third embodiment.

FIG. 14 is a flowchart showing the steps for displaying images performed in three-dimensional image display according to the third embodiment. The steps in the flowchart are started when the three-dimensional content playback unit 10 starts playing back stereoscopic images.

The three-dimensional content playback unit 10 plays back stereoscopic images of three-dimensional content (S10). When the interrupt request receiving unit 12 does not receive an interrupt request (N in S12), three-dimensional content playback unit 10 continues to play back stereoscopic images. When the interrupt request receiving unit 12 receives an interrupt request (Y in S12), the luminance value control unit 14 controls the luminance value of the stereoscopic images other than the image of the object 216 of the control menu (S14).

The closest coordinate acquisition unit 32 refers to the depth buffer 34 so as to acquire the closest spot coordinate (S34). The control menu output unit 16 outputs to the image buffer 18 the image of the object 216 of the control menu located more toward the viewpoint than the closest spot coordinate acquired by the closest coordinate acquisition unit 32 (S36).

The device with the configuration described above operates as follows. The user plays back stereoscopic images using the three-dimensional display device 100 according to the third embodiment. Responsive to the acquisition of an interrupt request by the interrupt request receiving unit 12 (e.g., the user's request to suspend the playback of content), the closest coordinate acquisition unit 32 refers to the depth buffer 34 so as to acquire the closest spot coordinate, and the control menu output unit 16 outputs to the image buffer 18 the image of the control menu located more toward the viewpoint than the closest spot coordinate.

Since the control menu is presented at a position closest to the viewpoint in the three-dimensional space as viewed by the user according to the third embodiment, there will be no inconsistency between the relative positions in the three-dimensional space so that the visibility of the control menu is improved.

The first through third embodiments are described above. Arbitrary combinations of the embodiments will also be useful.

For example, the second embodiment may be combined with the first embodiment or the third embodiment, and, further, the shutter glasses 210 may be provided with a sensor (not shown) for detecting whether the glasses are worn. An advantage provided by this configuration, in addition to the advantages of the first and third embodiment, is that images that depend on whether the shutter glasses 210 are worn can be presented, by using identical left and right parallax images in response to the removal of the shutter glasses 210 by the user. In other words, stereoscopic images are played back by projecting appropriate parallax images to the left and right eyes of the user while the user is wearing the shutter glasses 210. When the user is not wearing the shutter glasses 210, parallax-free images are presented to the user.

Described above is an explanation based on an exemplary embodiment. The embodiment is intended to be illustrative only and it will be obvious to those skilled in the art that various modifications to constituting elements and processes could be developed and that such modifications are also within the scope of the present invention.

While the embodiments described above assumes the use of a shutter to achieve three-dimensional television, any method to achieve three-dimensional television (e.g., a method using polarization or a method using a head-mount display) may be used.

What is claimed is:

1. A three-dimensional image display device comprising:
a three-dimensional content playback unit configured to output to two or more image buffers a plurality of stereoscopic images of three-dimensional content, including a first parallax image and a second parallax image, resulting from viewing an object as a three-dimensional (3D) object in a virtual three-dimensional space from different viewpoints,
wherein a plurality of 3D objects are displayed in the virtual three-dimensional space at various depths in a depth direction from a viewpoint of a user;
an interrupt request receiving unit configured to receive an interrupt request requesting that a control menu be displayed; and
a control menu output unit configured to display the control menu stereoscopically as a 3D menu object with parallax and to dynamically move the 3D menu object away from the viewpoint of the user in the depth direction after receiving the interrupt request,
wherein, as the 3D menu object fluidly moves away from the viewpoint,
if any 3D object is located in front of the 3D menu object in the depth direction, any portion of the 3D object overlapping with the 3D menu object is overwritten by the 3D menu object,
if any 3D object is located at a same depth of the 3D menu object in the depth direction, any portion of the 3D object overlapping with the 3D menu object is overwritten by the 3D menu object, and
if any 3D object is located behind the 3D menu object in the depth direction, any portion of the 3D object overlapping with the 3D menu object is overwritten by the 3D menu object,
wherein the user cannot interact with the 3D menu object until it arrives at a final location in the virtual three-dimensional space,
wherein the virtual three-dimensional space is defined such that a plane, where there is no parallax between the first parallax image and the second parallax image, coincides with a display screen of the display device displaying the image, and
the control menu output unit outputs the image of the menu object of the control menu drawn with parallax while moving the object of the control menu from a viewpoint that is nearer than the plane, where there is no parallax between the first parallax image and the second parallax image, until the object reaches the plane and the menu object is displayed with no parallax at the final location.

2. The three-dimensional image display device according to claim 1, further comprising:
a luminance value control unit configured to lower a luminance value of the stereoscopic images of the three-dimensional content in response to the acquisition of an interrupt request by the interrupt request receiving unit.

3. A three-dimensional image display method comprising:
outputting to two or more image buffers a plurality of stereoscopic images of three-dimensional content, including a first parallax image and a second parallax image, resulting from viewing an object as a three-dimensional (3D) object in a virtual three-dimensional space from different viewpoints,
wherein a plurality of 3D objects are displayed in the virtual three-dimensional space at various depths in a depth direction from a viewpoint of a user on a display device;
receiving an interrupt request requesting that a control menu be displayed; and
displaying the control menu stereoscopically as a 3D menu object with parallax and dynamically moving the 3D menu object away from the viewpoint of the user in the depth direction after receiving the interrupt request,
wherein, as the 3D menu object fluidly moves away from the viewpoint, if any 3D object is located in front of the 3D menu object in the depth direction, any portion of the 3D object overlapping with the 3D menu object is overwritten by the 3D menu object,
if any 3D object is located at a same depth of the 3D menu object in the depth direction, any portion of the 3D object overlapping with the 3D menu object is overwritten by the 3D menu object, and
if any 3D object is located behind the 3D menu object in the depth direction, any portion of the 3D object overlapping with the 3D menu object is overwritten by the 3D menu object,
wherein a user cannot interact with the 3D menu object until it arrives at a final location in the virtual three-dimensional space, and
wherein the virtual three-dimensional space is defined such that a plane, where there is no parallax between the first parallax image and the second parallax image, coincides with a display screen of the display device displaying the image,
outputting the image of the menu object of the control menu drawn with parallax while moving the object of the control menu from a viewpoint that is nearer than the plane, where there is no parallax between the first parallax image and the second parallax image, until the object reaches the plane and the menu object is displayed with no parallax at the final location.

4. A non-transitory computer readable medium having stored thereon a program, the program comprising:
a module configured to output to two or more image buffers a plurality of stereoscopic images of three-dimensional content, including a first parallax image and a second parallax image, resulting from viewing an object as a three-dimensional (3D) object in a virtual three-dimensional space from different viewpoints on a display device,
wherein a plurality of 3D objects are displayed in the virtual three-dimensional space at various depths in a depth direction from a viewpoint of a user;
a module configured to receive an interrupt request requesting that a control menu be displayed; and
a module configured to display the control menu stereoscopically as a 3D menu object with parallax and to dynamically move the 3D menu object away from the viewpoint of the user in the depth direction after receiving the interrupt request,
wherein, as the 3D menu object fluidly moves away from the viewpoint,
if any 3D object is located in front of the 3D menu object in the depth direction, any portion of the 3D object overlapping with the 3D menu object is overwritten by the 3D menu object,
if any 3D object is located at a same depth of the 3D menu object in the depth direction, any portion of the 3D object overlapping with the 3D menu object is overwritten by the 3D menu object, and
if any 3D object is located behind the 3D menu object in the depth direction, any portion of the 3D object overlapping with the 3D menu object is overwritten by the 3D menu object, and
wherein a user cannot interact with the 3D menu object until it arrives at a final location in the virtual three-dimensional space,
wherein the virtual three-dimensional space is defined such that a plane, where there is no parallax between the first parallax image and the second parallax image, coincides with a display screen of the display device displaying the image, and
the module configured to display the control menu outputs the image of the menu object of the control menu drawn with parallax while moving the object of the control menu from a viewpoint that is nearer than the plane, where there is no parallax between the first parallax image and the second parallax image, until the object reaches the plane and the menu object is displayed with no parallax at the final location.

* * * * *